(12) United States Patent
Chen et al.

(10) Patent No.: US 10,382,892 B2
(45) Date of Patent: Aug. 13, 2019

(54) BLUETOOTH DEVICE LOCATOR

(71) Applicant: Hewlett Packard Enterprise Development LP, Houston, TX (US)

(72) Inventors: Dongyao Chen, Palo Alto, CA (US); Yurong Jiang, Palo Alto, CA (US); Kyu-Han Kim, Palo Alto, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 15/582,276

(22) Filed: Apr. 28, 2017

(65) Prior Publication Data

US 2018/0317044 A1    Nov. 1, 2018

(51) Int. Cl.
| | |
|---|---|
| *H04W 4/02* | (2018.01) |
| *H04B 17/318* | (2015.01) |
| *H04B 17/27* | (2015.01) |
| *H04W 4/80* | (2018.01) |
| *G01S 5/00* | (2006.01) |
| *G01S 5/02* | (2010.01) |
| *G01S 11/06* | (2006.01) |
| *H04W 4/70* | (2018.01) |

(52) U.S. Cl.
CPC ............. *H04W 4/023* (2013.01); *G01S 5/00* (2013.01); *G01S 5/02* (2013.01); *G01S 11/06* (2013.01); *H04B 17/27* (2015.01); *H04B 17/318* (2015.01); *H04W 4/026* (2013.01); *H04W 4/80* (2018.02); *H04W 4/70* (2018.02)

(58) Field of Classification Search
CPC ..... H04W 4/023; H04W 4/008; H04W 4/026; H04B 17/318; H04B 17/27
USPC ....................................... 455/41.2
See application file for complete search history.

(56) References Cited

U.S. PATENT DOCUMENTS

| | | | |
|---|---|---|---|
| 8,634,853 B2 | 1/2014 | Bogatin | |
| 8,965,284 B2 | 2/2015 | Honkanen et al. | |
| 9,245,433 B1* | 1/2016 | Butler | H04W 4/029 |
| 2005/0221829 A1 | 10/2005 | Nishida et al. | |
| 2012/0235812 A1 | 9/2012 | Maia et al. | |
| 2013/0176869 A1* | 7/2013 | Finlow-Bates | H04W 52/0254 370/252 |
| 2017/0090010 A1 | 3/2017 | Dackefjord et al. | |

FOREIGN PATENT DOCUMENTS

| | | |
|---|---|---|
| CN | 103442428 | 12/2013 |
| KR | 10-2016-0076551 A | 7/2016 |
| WO | WO-14113882 | 7/2014 |

OTHER PUBLICATIONS

Ghose, A. et al.; "BlueEye—A System for Proximity Detection Using Bluetooth on Mobile Phones"; Sep. 8-12, 2013; 8 pages.

(Continued)

*Primary Examiner* — Eugene Yun

(74) *Attorney, Agent, or Firm* — Hewlett Packard Enterprise Patent Department

(57) ABSTRACT

Examples disclosed herein involve determining a location of a Bluetooth device relative to a detecting device based on measured received signal strength indication (RSSI). In examples herein, a regression analysis of RSSIs of a Bluetooth signal and locations of a detecting device are used to determine the location of the target Bluetooth device.

19 Claims, 7 Drawing Sheets

(56) References Cited

OTHER PUBLICATIONS

Wang et al., "No need to war-drive: unsupervised indoor localization", Proceedings of the 10th international conference on Mobile systems, applications, and services. ACM, 2012, pp. 197-210.
Tse et al., "Fundamentals of Wireless Communication", Cambridge University Press, Dec. 9, 2004, 644 pages.
T. D. Of Transportation, TxDOT survey manual—GPS RTK surveying, available online at < http://onlinemanuals.txdot.gov/bcdotmanuals/ess/gps_rtk_surveying.htm > Apr. 2011, 6 pages.
Srinivasan et al., "An empirical study of low-power wireless", ACM Transactions on Sensor Networks (TOSN), vol. 6, No. 2, Article 16, 2010, 49 pages.
Sen et al., "You are facing the Mona Lisa: spot localization using PHY layer information", Proceedings of the 10th international conference on Mobile systems, applications, and services. ACM, 2012, 14 pages.
RTKLIB: An open source program package for GNSS positioning, 2013, 3 pages.
R. I. Technologies, What is differential GPS, available online at < https://www.roseindia.net/technology/gps/what-isDifferential-GPS.shtml > Feb. 1, 2008, 6 pages.
Mariakakis et al., "SAIL: Single Access Point-Based Indoor Localization", Proceedings of the 12th annual international conference on Mobile systems, applications, and services (Mobisys 2014), pp. 315-328.
Lee et al., "Accuracy Enhancement of RSSI-based Distance Estimation by Applying Gaussian Filter", Indian Journal of Science and Technology, vol. 9, Issue 20, 2016, 5 pages.
Jiang et al., "CARLOC: Precisely Tracking Automobile Position", In Proceedings of the 13th ACM Conference on Embedded Networked Sensor Systems (SenSys). Nov., 2015, pp. 253-265.
International Search Report and Written Opinion received for PCT Patent Application No. PCT/US2018/028608, dated on Jul. 31, 2018, 12 pages.
Hedgecock et al., "Accurate real-time relative localization using single-frequency gps", In Proceedings of the 12th ACM Conference on Embedded Network Sensor Systems, ACM, 2014, pp. 206-220.
Fred Lambert, Tesla Autopilot 2.0: next gen Autopilot powered by more radar, new triple camera, some equipment already in production, Aug. 11, 2016, 14 pages.
Lau et al., "Enhanced RSSI-Based High Accuracy Real-Time User Location Tracking System for Indoor and Outdoor Environments", International Journal on Smart Sensing and Intelligent Systems, vol. 1, No. 2, Jun. 2008, pp. 534-548.
Chen et al ., "SSL: Signal Similarity-Based Localization for Ocean Sensor Networks", Sensors, vol. 15, 2015, pp. 29702-29720.

* cited by examiner

US 10,382,892 B2

BLUETOOTH DEVICE LOCATOR

BACKGROUND

Bluetooth technology is a wireless technology standard that is used to exchange data over relatively short distances (e.g., within 15 meters). Bluetooth uses a dedicated frequency range (e.g., between 2.4 GHz and 2.485 GHz) to send and receive signals between Bluetooth compatible devices (e.g., smartphones, tablet computers, Internet of Things (IoT) devices, automobile computer systems, headsets, wearable devices, etc.). Bluetooth devices broadcast identification signals that may be used to identify or detect Bluetooth devices within range of another Bluetooth device and/or pair Bluetooth devices with one another to secure a dedicated communication path between the Bluetooth devices.

BRIEF DESCRIPTION OF THE DRAWINGS

Wherever possible, the same reference numbers will be used throughout the drawing(s) and accompanying written description to refer to the same or like parts.

DETAILED DESCRIPTION

Figure 1:
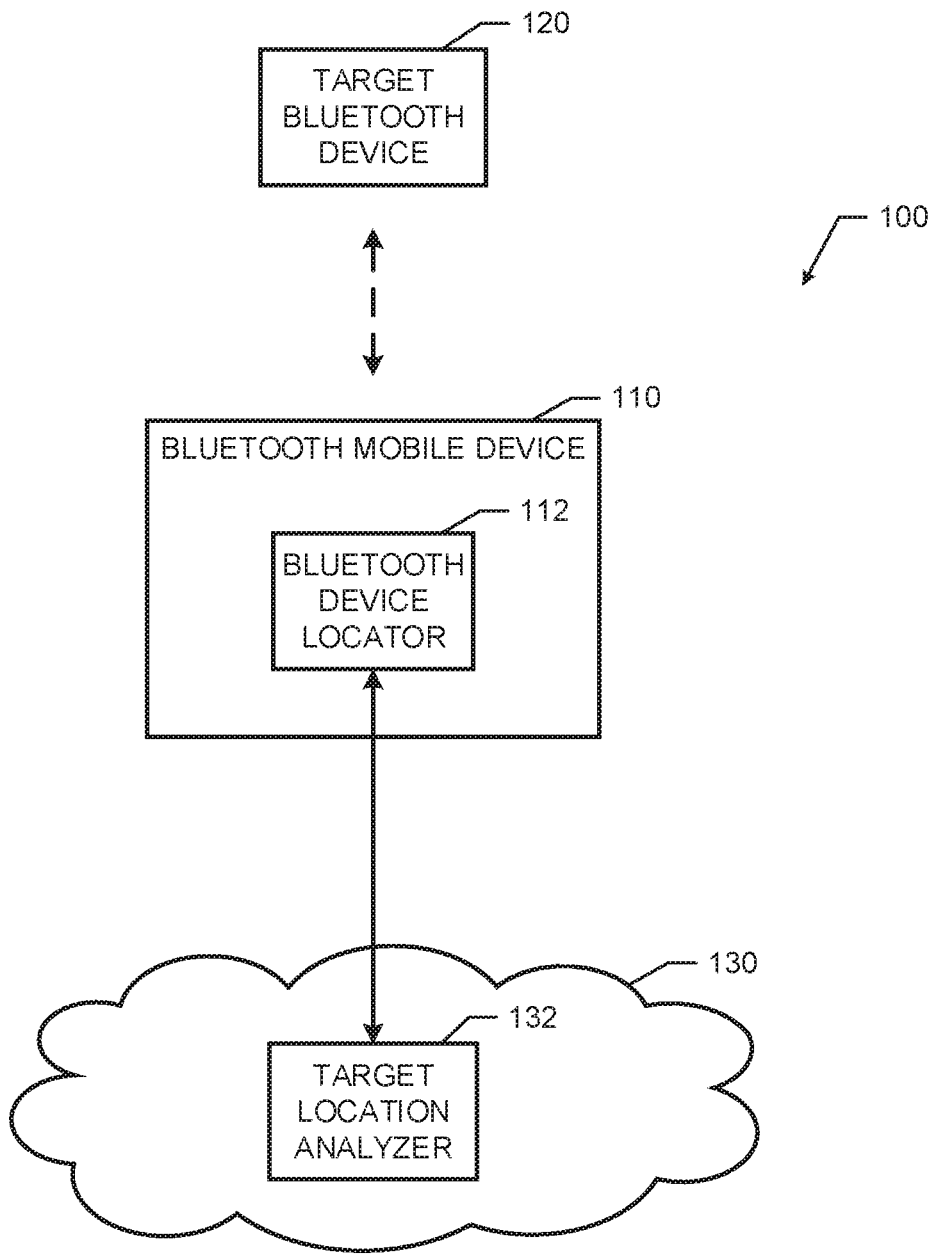
FIG. 1 illustrates a schematic diagram of an example Bluetooth communication system including a Bluetooth device locator and a target location analyzer that may be implemented in accordance with an aspect of this disclosure.

Examples disclosed herein involve determining a location of a Bluetooth device relative to another Bluetooth device. In examples herein, received signal strength indicators (RSSI) of a Bluetooth signal may be used to estimate a location of a Bluetooth device emitting the Bluetooth signal. For example, using a location of a detecting Bluetooth device, movement of the detecting Bluetooth device, an orientation of the Bluetooth device, and a plurality of measured RSSIs of a received Bluetooth signal at different locations, an analysis (e.g., a regression) may be performed to determine the location of a target Bluetooth device relative to the detecting Bluetooth device.

In examples herein, Bluetooth detecting devices (e.g., a smartphone, a tablet computer, a Bluetooth device of an automobile, a wearable Bluetooth device, etc.) may be used to indicate a relative location or position of another Bluetooth device among people, objects, devices, buildings, etc. Determining a location of a Bluetooth device may enable a user or object to find an individual/device in a public place (either indoor or outdoor), avoid an accident/collision on a road, etc. In previous techniques, an analysis of RSSI of Bluetooth devices may be used to determine a range from a particular Bluetooth device. However, an example range may be too far to enable a user or device to efficiently locate the device. Because Bluetooth signals may have a range of up to approximately 15 meters, in many instances, it can be difficult to locate a particular device within such a space (e.g., a circle with a 15 meter radius). Furthermore, such a space may include obstacles or obstructions that would further make it difficult for a user to detect or find a device. Examples herein may be used to find a particular direction in addition to the range from a Bluetooth device to determine a relative position (e.g., coordinates) from a detecting device. Accordingly, users may detect and/or locate Bluetooth devices more efficiently and effectively as the location (e.g., within 1-2 meters), rather than only the range, of the Bluetooth device may be determined.

An example method includes detecting a Bluetooth signal from the Bluetooth device at a first location of the detecting device and determining a first received RSSI of the Bluetooth signal at the first location; detecting the Bluetooth signal from the Bluetooth device at a second location of the detecting device and determining a second RSSI of the Bluetooth signal at the second location; and determining a location of the Bluetooth device relative to the detecting device based on the first RSSI and the second RSSI.

Examples herein may involve receiving a plurality of measured RSSIs of a Bluetooth signal of a target Bluetooth device; performing a regression analysis on the received RSSIs of the Bluetooth signal based on locations of a mobile Bluetooth device where the respective RSSIs of the Bluetooth signal were measured; and determining candidate target locations of the target Bluetooth device based on the regression analysis, one of the candidate target locations comprising an estimated actual location of the target Bluetooth device.

An examples system includes a target location analyzer and a Bluetooth device locator. The example target location analyzer may receive measured received signal strength indicators (RSSI) of Bluetooth signals from a target Bluetooth device, perform a regression analysis based on the RSSIs and locations of a detecting device that measured the RSSIs, and candidate locations of the target Bluetooth device based on the regression analysis. The example Bluetooth device locator may determine an orientation of the detecting device and select one of the candidate locations of the target Bluetooth device based on the orientation of the detecting device FIG. 1 is a schematic diagram of an example Bluetooth communication system 100 including a Bluetooth mobile device 110 with a Bluetooth device locator 112 and target location analyzer 132 that are constructed in accordance with examples herein. The example Bluetooth communication system 100 of FIG. 1 includes the Bluetooth mobile device 110 (with the Bluetooth device locator 112) in communication with a network 130 and a target Bluetooth device 120. The example Bluetooth device locator 112 may identify and/or locate the target Bluetooth device 120 using information from the target location analyzer 132 of the network 130. In some examples, the Bluetooth device locator 112 may detect the location of the target Bluetooth device 120 without the use of the target location analyzer 132 and/or the target location analyzer 132 may be collocated with the Bluetooth device locator 112 on or within the Bluetooth mobile device 110.

In examples herein, the example Bluetooth mobile device 110 may be any portable electronic device with Bluetooth communication capabilities. For example, the Bluetooth mobile device 110 may be a smartphone, a tablet computer, a laptop computer, an automobile control system, an Internet of Things (IoT) device, or any other Bluetooth compatible device. The example Bluetooth mobile device 110 may further include a plurality of sensors and/or measuring devices (e.g., an accelerometer, a global positioning system (GPS), a compass, an altimeter, a gyroscope, a thermometer, etc.) that are capable of measuring and detecting the location of the Bluetooth mobile device 110 and/or characteristics of an environment of the Bluetooth mobile device 110. In examples herein, the Bluetooth mobile device 110 may communicate with the network 130 and the target location analyzer 132. For example, the Bluetooth mobile device 110 may communicate with the network via a Wi-Fi communication, a cellular network communication, Ethernet connection, etc. Accordingly, the Bluetooth device locator 112 may have access to the target location analyzer 132 to determine the location of the target Bluetooth device 120.

Furthermore, the example Bluetooth mobile device 110 may present information to a user via a user interface. For example, the Bluetooth mobile device may present the determined location of the target Bluetooth device 120 on a display (e.g., a touchscreen, a light emitting diode (LED), a liquid crystal display (LCD), an organic light emitting diode (©LED) display, etc.) of the Bluetooth mobile device 110. Accordingly, a user of the Bluetooth mobile device 110 may determine the estimated location of the target Bluetooth device 120 relative to the Bluetooth mobile device 110.

The example target location analyzer 132 may be implemented within α cloud server or cloud computing system within or in communication with the network 130. The example target location analyzer 132 may process information from the Bluetooth device locator 112 and/or the Bluetooth mobile device 110 to determine candidate locations of the target Bluetooth device 120. For example, as further described below, the target location analyzer 132 may perform a regression analysis (including a cross validation analysis) to determine the candidate locations, and/or a collaborative correction analysis to verify the location of the target Bluetooth device 120 based on an analysis of at least one other Bluetooth device that is associated with the target Bluetooth device 120. In some examples, the target location analyzer 132 of FIG. 1 may be implemented or located within the Bluetooth mobile device 110 and/or the Bluetooth device locator 112.

Figure 2:
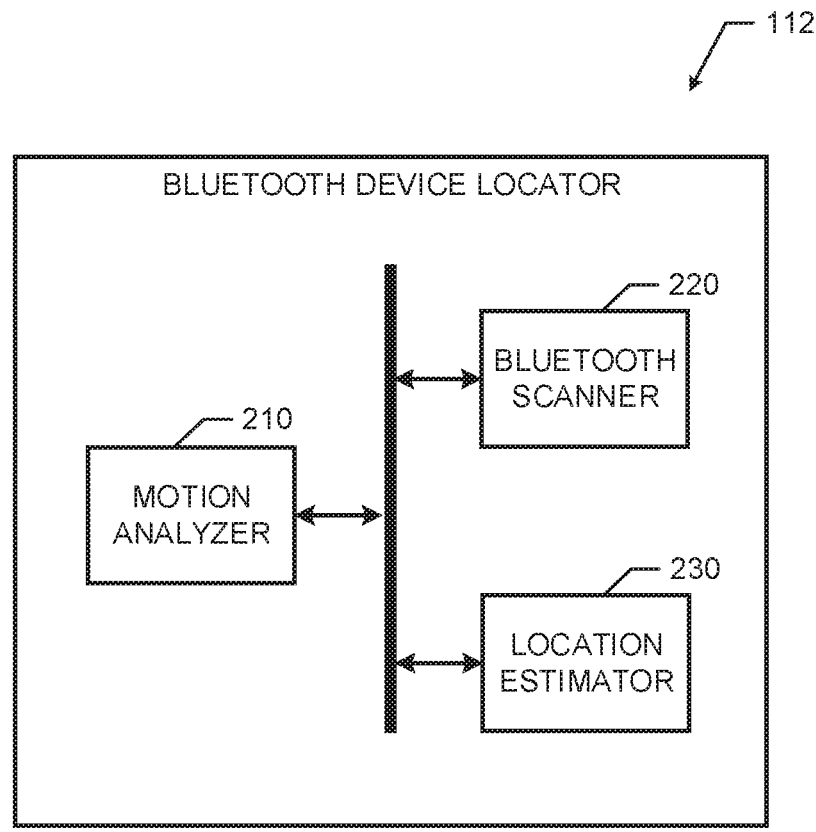
FIG. 2 is a block diagram of an example Bluetooth device locator that may be used to implement the Bluetooth device locator of FIG. 1.

FIG. 2 is a block diagram of an example Bluetooth device locator 112 that may be used to implement the Bluetooth device locator 112 of FIG. 1. The example Bluetooth device locator 112 of FIG. 2 includes a motion analyzer 210, a Bluetooth scanner 220, and a location estimator 230. In examples herein, the movement analyzer 210 determines motion of the Bluetooth mobile device 210, the Bluetooth scanner identifies signals from Bluetooth devices within range of the mobile device 110 (e.g., the target Bluetooth device 120), and the location estimator 230 determines the location of target Bluetooth devices using information from the motion analyzer 210, the Bluetooth scanner 220, and/or a target location analyzer, such as the target location analyzer 132 of FIG. 1.

In FIG. 2, the motion analyzer 210 determines a location and/or posture of the mobile device 110 based on measurements from sensors of the mobile device 110. Accordingly, the motion analyzer 210 may determine whether the Bluetooth mobile device 110 is not moving, moving, an orientation of the Bluetooth mobile device 110, etc. The motion analyzer 210 may gather such information and provide the information to the location estimator 230, which may be used to determine a location of the target Bluetooth device 120 relative to the Bluetooth mobile device 110.

The example Bluetooth scanner 220 scans for Bluetooth signals from Bluetooth devices within range of the Bluetooth mobile device 110. The example Bluetooth scanner 220 may detect Bluetooth signals, record the signal strength of the detected Bluetooth signals with identifiers in the signals corresponding to Bluetooth devices transmitting the signals, and timing associated with detecting the Bluetooth signals.

The example location estimator 230 determines a location of the target Bluetooth device relative to the location of the Bluetooth mobile device 110. For example, the location estimator 230 may determine a location of the target Bluetooth device based on measured RSSIs by the Bluetooth mobile device 110 at a plurality of locations. Using the measured RSSIs, the location estimator 230 may estimate the location of the target Bluetooth device 120.

In some examples, the location estimator 230 may receive candidate locations of the target Bluetooth device 120 from the target location analyzer 132. For example, the location estimator 230 may select a target location from multiple candidate target locations determined from an analysis of the target location analyzer 132. The location estimator 230 may use an orientation of the Bluetooth mobile device 110 to determine that one of the candidate locations determined by the target location analyzer 132 is the location of the target Bluetooth device 120. For example, knowing the orientation of the Bluetooth mobile device 110 may indicate a direction from which the Bluetooth signals were received from the target Bluetooth device 120. The direction may have been determined based on characteristics of the measured RSSIs of the received Bluetooth signals, themselves. For example, the example location estimator 230 may compare characteristics (e.g., value, noise, signal fluctuation, etc.) of the measured RSSI to historical information corresponding to measured RSSIs and orientations of the Bluetooth mobile device 110. For example, the location estimator 230 may store historical information of received Bluetooth signals in α historical database. Such a historical database may store historical information indicating a direction from which previous Bluetooth signals were received by the Bluetooth mobile device 110, the orientation of the Bluetooth mobile device 110 when the previous signals were received, and the characteristics of the previous Bluetooth signals. Accordingly, the location estimator 230 may select a location from the candidate locations by finding similar RSSIs in the historical database and/or orientations in the historical database and selecting the candidate location nearest the direction indicated in the historical database.

While an example manner of implementing the Bluetooth device locator 112 of FIG. 1 is illustrated in FIG. 2, at least one of the elements, processes and/or devices illustrated in FIG. 2 may be combined, divided, re-arranged, omitted, eliminated and/or implemented in any other way. Further, the motion analyzer 210, the Bluetooth scanner 220, the location estimator 230 and/or, more generally, the example Bluetooth device locator 112 of FIG. 2 may be implemented by hardware and/or any combination of hardware and executable instructions (e.g., software and/or firmware). Thus, for example, any of the motion analyzer 210, the Bluetooth scanner 220, the location estimator 230 and/or, more generally, the example Bluetooth device locator 112 could be implemented by at least one of an analog or digital circuit, a logic circuit, a programmable processor, an application specific integrated circuit (ASIC), a programmable logic device (PLD) and/or a field programmable logic device (FPLD). When reading any of the apparatus or system claims of this patent to cover a purely software and/or firmware implementation, at least one of the motion analyzer 210, the Bluetooth scanner 220, and/or the location estimator 230 is/are hereby expressly defined to include a tangible machine readable storage device or storage disk such as a memory, a digital versatile disk (DVD), a compact disk (CD), a Blu-ray disk, etc, storing the executable instructions. Further still, the example Bluetooth device locator 112 of FIG. 2 may include at least one element, process, and/or device in addition to, or instead of, those illustrated in FIG. 2, and/or may include more than one of any or all of the illustrated elements, processes and devices.

Figure 3:
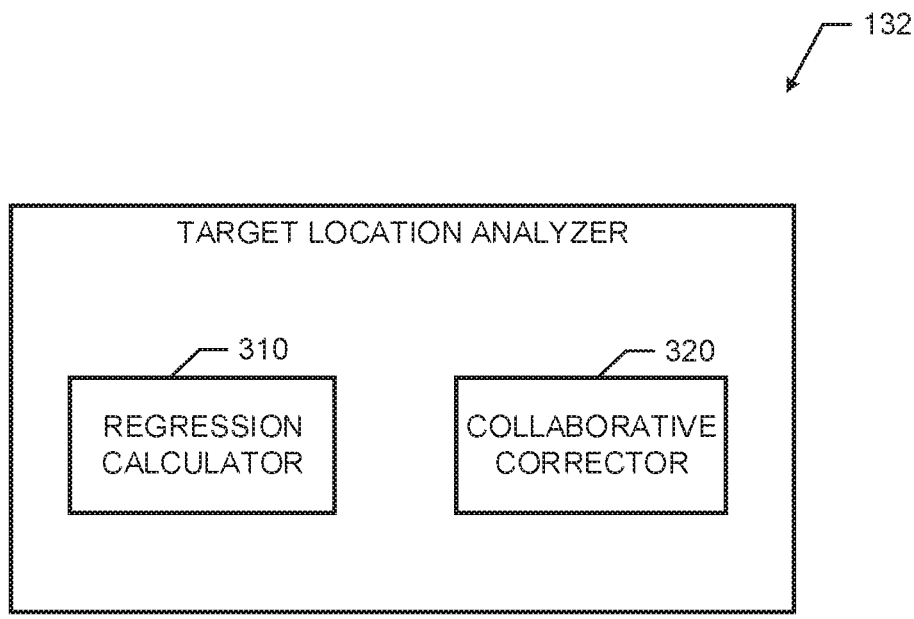
FIG. 3 is a block diagram of an example target location analyzer that may be used to implement the target location analyzer of FIG. 1.

FIG. 3 is a block diagram of an example target location analyzer 132 that may be used to implement the target location analyzer 132 of FIG. 1. The example target location analyzer 132 of FIG. 3 includes a regression calculator 310 and a collaborative corrector 320. The example location estimator target location analyzer 132 may use information corresponding to movement of the Bluetooth mobile device 110 measured by the motion analyzer 210 and signal information from the Bluetooth scanner 220 to determine candidate locations of target Bluetooth devices (e.g., the target Bluetooth device 120 of FIG. 1). For example, the target location analyzer 132 may use information from the Bluetooth scanner 220 for a Bluetooth signal detected at two separate locations measured by the motion analyzer 210. In such an example, the Bluetooth scanner 220 detects a Bluetooth signal from the Bluetooth target device 120 at a first location of the Bluetooth mobile device 110 and a first RSSI of the Bluetooth signal at the first location. The Bluetooth scanner 220 may then detect the Bluetooth signal from the Bluetooth target device 120 at a second location of the Bluetooth mobile device 110. In examples herein, the regression calculator performs a regression analysis on location and position information received from the Bluetooth device locator 112 and the collaborative corrector 330 verifies locations of the target Bluetooth device 120 based on a collaboration analysis of other target Bluetooth devices associated with the target Bluetooth device 120.

The example regression calculator 310 of FIG. 3 performs a regression analysis. For example, the regression calculator 310 may determine a differential of measured RSSIs of signals from the Bluetooth mobile device 110. For example, the differential signals may be subsequently measured RSSIs of a signal at a first location and at a second location. The regression calculator 310 may then calculate a regression of the differential (e.g., a least square regression). In some examples, the regression calculator 310 may perform filtering of measured signals. For example, the regression calculator 310 may perform noise filtering or outlier filtering of regressions of the differentials of the RSSI signals. In some examples, the regression calculator 310 rotates differential reference points and performs another regression analysis on the measured Bluetooth signals for validation of the determined locations. Accordingly, the regression calculator 310 may process the measured RSSIs of Bluetooth signals to provide an accurate analysis of the Bluetooth signals to the location estimator 230.

The example collaborative corrector 320 functions when multiple Bluetooth devices are determined to be associated with the target Bluetooth device 120. For example, the collaborative collector 320 may determine that one other or a plurality of other Bluetooth device(s) are associated with the target Bluetooth device 120. In such an example, the collaborative corrector 320 may determine the plurality of Bluetooth devices are associated with the target Bluetooth device 1210 (and one another) based on patterns of measured RSSIs from the plurality of Bluetooth devices and the target Bluetooth device 120. Associated Bluetooth devices may indicate that a particular Bluetooth device (e.g., the target Bluetooth device 120) has a physical relationship to another device. As examples of associated Bluetooth devices, multiple associated Bluetooth devices may include when the Bluetooth devices are moving together in an automobile, when there are multiple Bluetooth devices on an individual person (e.g., a wearable Bluetooth device and a Bluetooth mobile device), etc. The example collaborative corrector 320 may thus compare processed and measured RSSIs of associated Bluetooth devices to confirm a location of the target Bluetooth device 120 or increase the accuracy of determining the location of the Bluetooth device 120.

Accordingly, the target location analyzer 132 of FIG. 3 may be used to process measured RSSIs of signals from the Bluetooth device locator 112 to determine or validate a location of the target Bluetooth device 120 relative to a location of the Bluetooth mobile device 110.

While an example manner of implementing the target location analyzer 132 of FIG. 1 is illustrated in FIG. 3, at least one of the elements, processes and/or devices illustrated in FIG. 3 may be combined, divided, re-arranged, omitted, eliminated and/or implemented in any other way. Further, the regression calculator 310, the collaborative corrector 320 and/or, more generally, the example target location analyzer 132 of FIG. 3 may be implemented by hardware and/or any combination of hardware and executable instructions (e.g., software and/or firmware). Thus, for example, any of the regression calculator 310, the collaborative corrector 320 and/or, more generally, the example target location analyzer 132 could be implemented by at least one of an analog or digital circuit, a logic circuit, a programmable processor, an application specific integrated circuit (ASIC), a programmable logic device (PLD) and/or a field programmable logic device (FPLD). When reading any of the apparatus or system claims of this patent to cover a purely software and/or firmware implementation, at least one of the regression calculator 310 and/or the collaborative corrector 320 is/are hereby expressly defined to include a tangible machine readable storage device or storage disk such as a memory, a digital versatile disk (DVD), a compact disk (CD), a Blu-ray disk, etc. storing the executable instructions. Further still, the example target location analyzer 132 of FIG. 3 may include at least one element, process, and/or device in addition to, or instead of, those illustrated in FIG. 3, and/or may include more than one of any or all of the illustrated elements, processes and devices.

Figure 4:
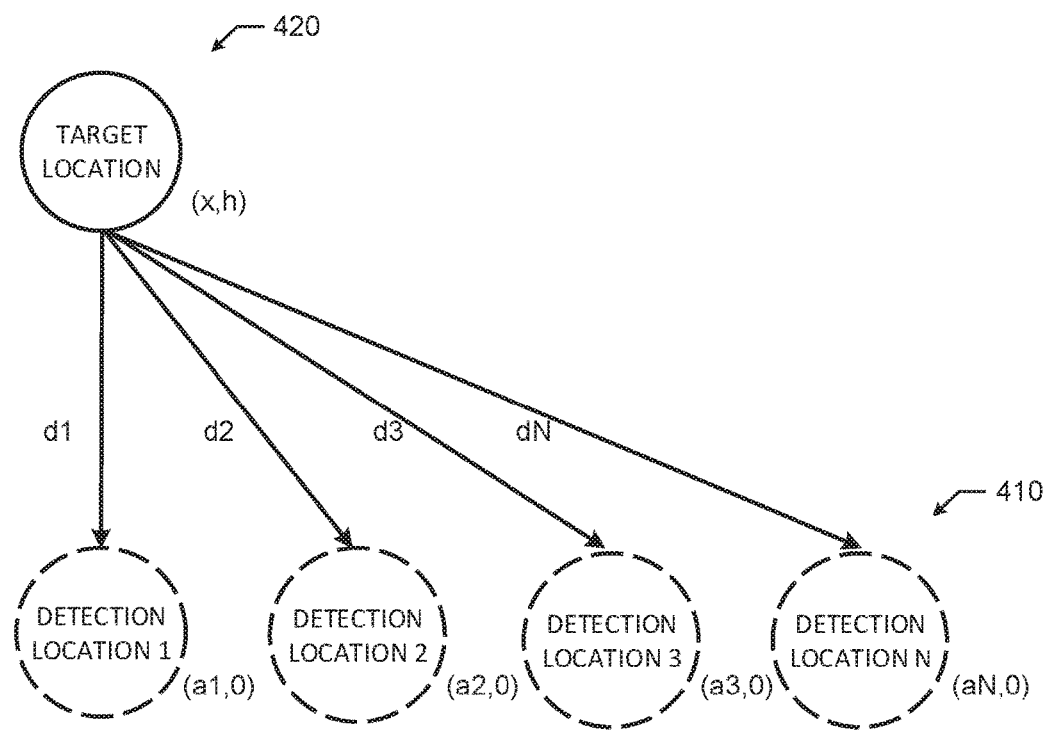
FIG. 4 is an example overview illustration of a location analysis that may be performed by the Bluetooth device locator and/or the target location analyzer of FIGS. 2 and/or 3.

FIG. 4 is an example overview illustration of a location analysis that may be performed by the Bluetooth device locator 112 and/or the target location analyzer 132 of FIGS. 2 and/or 3, respectively. In the illustrated example of FIG. 4, a Bluetooth mobile device (such as the Bluetooth mobile device 110 moves sequentially from detection locations 1, to 2, to 3, to N (represented by dashed circles) (which may be referred to collectively herein as detection locations 410). The example Bluetooth mobile device 410 utilizes a Bluetooth device locator 112 and/or a target location analyzer 132 to determine a target location 420 (represented by a solid circle) of a target Bluetooth device (such as the target Bluetooth device 120). For illustrative purposes, in FIG. 4, the target location 420 is a static location. However, in some examples, the target location 420 may also be a dynamic location that moves along with a target Bluetooth device. Examples herein may account for a static location or dynamic locations of a target Bluetooth device to determine the location of the target Bluetooth device relative of a detecting Bluetooth mobile device.

In the illustrated example of FIG. 4, a Bluetooth device locator 112 may make multiple RSSI measurements of Bluetooth signals at the detection locations 410. The example Bluetooth device locator 112 may measure a Bluetooth signal from a target Bluetooth device at the target location 420 at each of the detection locations 410. In some examples, the Bluetooth device locator 112 measures multiple RSSIs of the Bluetooth signal at each detection location 410.

Referring to FIG. 4, the following analysis may be performed by the Bluetooth device locator 112 and/or the target location analyzer 132 to determine the target location 420 based on measured RSSI at the detection locations 410. Between each detection location 410, a differential of the RSSIs measured at each location can be calculated and filtered (e.g., via the target location analyzer 132) to determine relative distances to the target location 420 from the detection locations 410, as follows:

$$\nabla RSSI = RSSI_2 - RSSI_1 = 10n\log\left(\frac{d_1}{d_2}\right) \quad (1)$$

where $RSSI_1$ is an average RSSI measured at detection location 1, $RSSI_2$ is an average RSSI measured at detection location 2, n is a fading coefficient of the environment of the example 400, d1 is the distance between the target location 420 and detection location 1, and d2 is the distance between the target location 420 and detection location 2. Equation 1 may be reformed for detection locations i,j (where i,j can be two of the detection locations 410) to the following:

$$1 + 2(a_i - a_j)\alpha + (a_i - a_j)^2 \beta = e^{\frac{\nabla RSSI_{i,j}}{5n}} \quad (2)$$

where $$\alpha = \frac{(x - a_i)}{(x - a_i)^2 + h^2} \quad (3)$$

and $$\beta = \frac{1}{(x - a_i)^2 + h^2} \quad (4)$$

and $(a_i - a_j)$ is a known value corresponding to the distance moved between detection locations i,j using motion sensors and location information measured by the mobile device at the detection locations 410. Accordingly, to estimate the coordinates of the target location 420, (x,h), which is represented in $\alpha$ and $\beta$, the coefficients may be solved by performing a least square regression (e.g., via the target location analyzer 132), as follows:

$$\min\Sigma_{i,j}\left(1 + 2(a_i - a_j)\alpha + (a_i - a_j)^2\beta = e^{\frac{\nabla RSSI_{i,j}}{5n}}\right) \quad (5)$$

From the above example optimization problem, which may be calculated by the regression calculator 310 of the target location analyzer 132, two candidate locations may be determined as the target location 420. Accordingly, based on the measurements of the RSSIs themselves and the orientation of the Bluetooth mobile device 110 (measured by sensors of the Bluetooth mobile device 110), the location estimator 230 may determine that one of the candidate locations is the actual target location 420 using historical information and measurements of RSSIs of the mobile Bluetooth device that moved between the detection locations 410, as described above.

Figure 5:
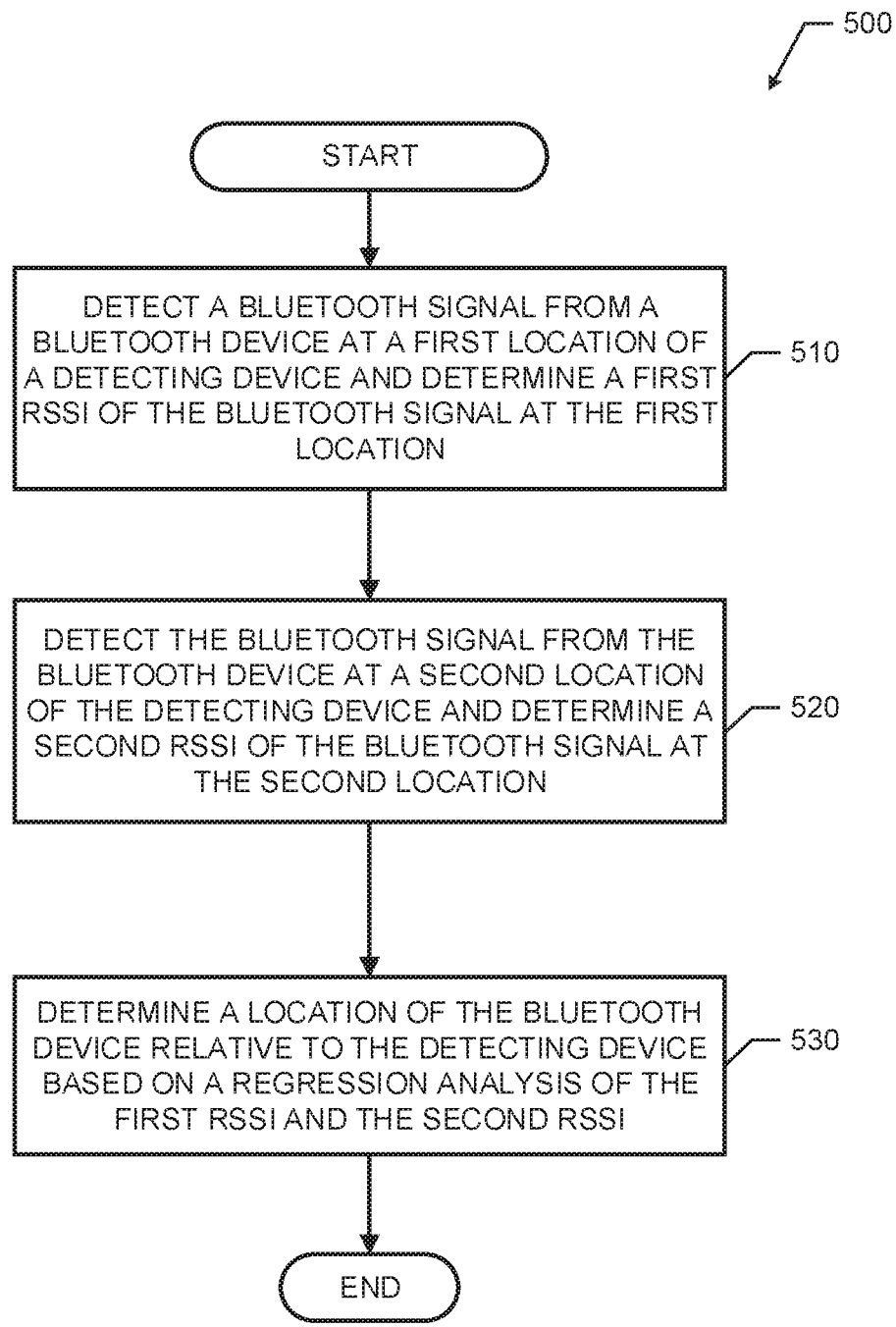
FIG. 5 is a flowchart representative of example machine readable instructions that may be executed to implement the Bluetooth device locator of FIG. 2.

A flowchart representative of example machine readable instructions for implementing the Bluetooth device locator 110 of FIG. 2 is shown in FIG. 5. In this example, the machine readable instructions comprise a program/process for execution by a processor such as the processor 712 shown in the example processor platform 700 discussed below in connection with FIG. 7. The program/process may be embodied in executable instructions (e.g., software) stored on a non-transitory machine readable storage medium such as a CD-ROM, a floppy disk, a hard drive, a digital versatile disk (DVD), a Blu-ray disk, or a memory associated with the processor 712, but the entire program/process and/or parts thereof could be executed by a device other than the processor 712 and/or embodied in firmware or dedicated hardware. Further, although the example program is described with reference to the flowchart illustrated in FIG. 5, many other methods of implementing the example Bluetooth device locator 110 may be used. For example, the order of execution of the blocks may be changed, and/or some of the blocks described may be changed, eliminated, or combined.

The example process 500 of FIG. 5 begins with an initiation of the Bluetooth device locator 112 (e.g., upon startup, upon instructions from a user, upon startup of a device implementing the Bluetooth device locator 112 (e.g., the Bluetooth mobile device 110), etc.). The example process 500 may be executed to estimate or determine a location of the target Bluetooth device 120 relative to the Bluetooth mobile device 110. At block 510, the Bluetooth scanner 220 detects a Bluetooth device (e.g., the target Bluetooth device 120) at a first location of a detecting device (e.g., the Bluetooth mobile device 110) and determines a first RSSI of the Bluetooth signal at the first location.

At block 520, the Bluetooth scanner 220 detects the Bluetooth signal from the Bluetooth device (e.g., the target Bluetooth device) at a second location of the detecting device and determines a second RSSI of the Bluetooth signal at the second location. For example, from block 510 to block 520, the detecting device may have moved from the first location to the second location across a particular distance during a particular time period. Furthermore, at block 520, the Bluetooth scanner 220 may detect the Bluetooth signal is the same signal as the Bluetooth signal in block 510 based on an identification broadcast within the Bluetooth signal.

At block 530, the example location estimator 230 determines a location of the Bluetooth device relative to the detecting device based on the first RSSI and the second RSSI. For example, the location estimator 230 may calculate the relative location of the Bluetooth device based on a position and orientation of the detecting device. In some examples, at block 530, the location estimator 230 may determine the location of the Bluetooth device from candidate locations determined by the target location analyzer 132 and an orientation of the detecting device. For example, the target location analyzer 132 may calculate a differential of the first RSSI and second RSSI to determine candidate locations of the Bluetooth device based on a movement of the detecting device. After block 530, the example process 500 ends.

Figure 6:
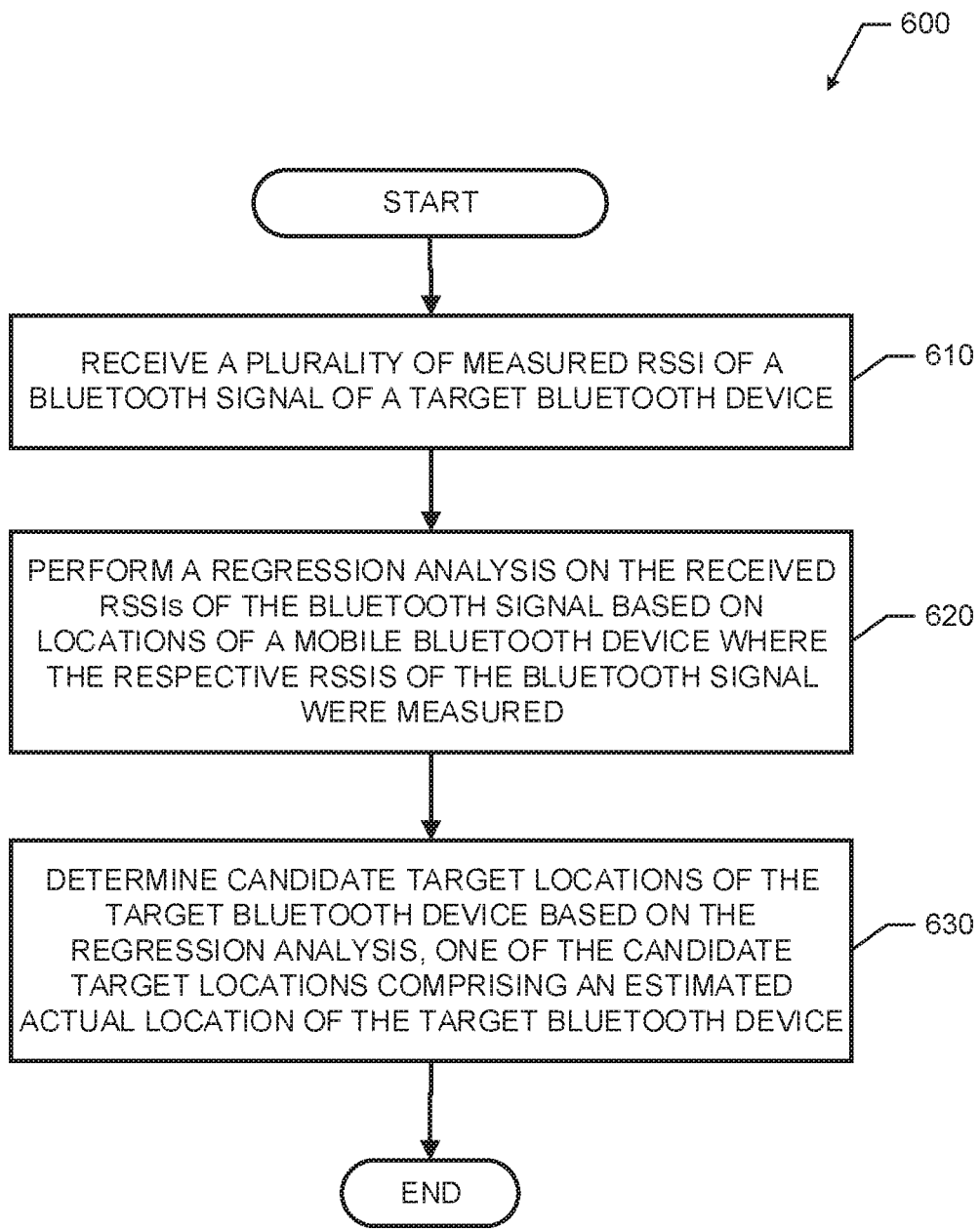
FIG. 6 is a flowchart representative of example machine readable instructions that may be executed to implement the target location analyzer of FIG. 3.

A flowchart representative of example machine readable instructions for implementing the target location analyzer 132 of FIG. 3 is shown in FIG. 6. In this example, the machine readable instructions comprise a program/process for execution by a processor such as the processor 712 shown in the example processor platform 700 discussed below in connection with FIG. 7. The program/process may be embodied in executable instructions (e.g., software) stored on a non-transitory machine readable storage medium such as a CD-ROM, a floppy disk, a hard drive, a digital versatile disk (DVD), a Blu-ray disk, or a memory associated with the processor 712, but the entire program/process and/or parts thereof could be executed by a device other than the processor 712 and/or embodied in firmware or dedicated hardware. Further, although the example program is described with reference to the flowchart illustrated in FIG. 6, many other methods of implementing the example target location analyzer 132 may be used. For example, the order of execution of the blocks may be changed, and/or some of the blocks described may be changed, eliminated, or combined.

The example process 600 of FIG. 6 begins with an initiation of the target location analyzer 132 (e.g., upon startup, upon instructions from a user, upon startup of a device implementing the target location analyzer 132 (e.g., the Bluetooth mobile device 110, a cloud server, etc.), etc.). The example process 600 of FIG. 6 may be executed to determine candidate target locations of the target Bluetooth device 120 based on an analysis of RSSIs of Bluetooth signals measured at multiple locations of the Bluetooth mobile device 110. At block 610, the example target location analyzer 132 receives a plurality of measured RSSIs of a Bluetooth signal of a target Bluetooth device (e.g., the target Bluetooth device 120). For example, the measured RSSIs may be received from the Bluetooth mobile device 110 and/or the Bluetooth device locator 112.

At block 620, the regression calculator 310 performs a regression analysis on the received RSSIs of the Bluetooth signal based on a location of a mobile Bluetooth device (e.g., the mobile Bluetooth device 110) that measured the RSSIs of the Bluetooth signal. At block 630, the target location analyzer 132 determines candidate locations of the target Bluetooth device based on the regression analysis, such that one of the candidate target locations includes an estimated actual location of the target Bluetooth device. After block 630, the example process 600 ends. In some examples, after block 630, the collaborative corrector 320 may perform a collaborative correction analysis by performing a regression analysis on a plurality of Bluetooth signals from another Bluetooth device associated with the target Bluetooth device (e.g., a Bluetooth device that is collocated with the target Bluetooth device). The example collaborative correction analysis may be used to increase the accuracy of estimating the location of the target Bluetooth device 120 relative to the mobile Bluetooth device 110.

As mentioned above, the example processes of FIGS. 5 and/or 6 may be implemented using coded instructions (e.g., computer and/or machine readable instructions) stored on a non-transitory machine readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible machine readable storage medium is expressly defined to include any type of machine readable storage device and/or storage disk and to exclude propagating signals and to exclude transmission media. As used herein, "computer readable storage medium" and "machine readable storage medium" are used interchangeably. Additionally or alternatively, the example processes of FIGS, 5 and/or 6 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory machine readable medium is expressly defined to include any type of machine readable storage device and/or storage disk and to exclude propagating signals and to exclude transmission media.

As used herein, when the phrase "at least" is used as the transition term in a preamble of a claim, it is open-ended in the same manner as the term "comprising" is open ended. As used herein the term "a" or "an" may mean "at least one," and therefore, "a" or "an" do not necessarily limit a particular element to a single element when used to describe the element. As used herein, when the term "or" is used in a series, it is not, unless otherwise indicated, considered an "exclusive or."

Figure 7:
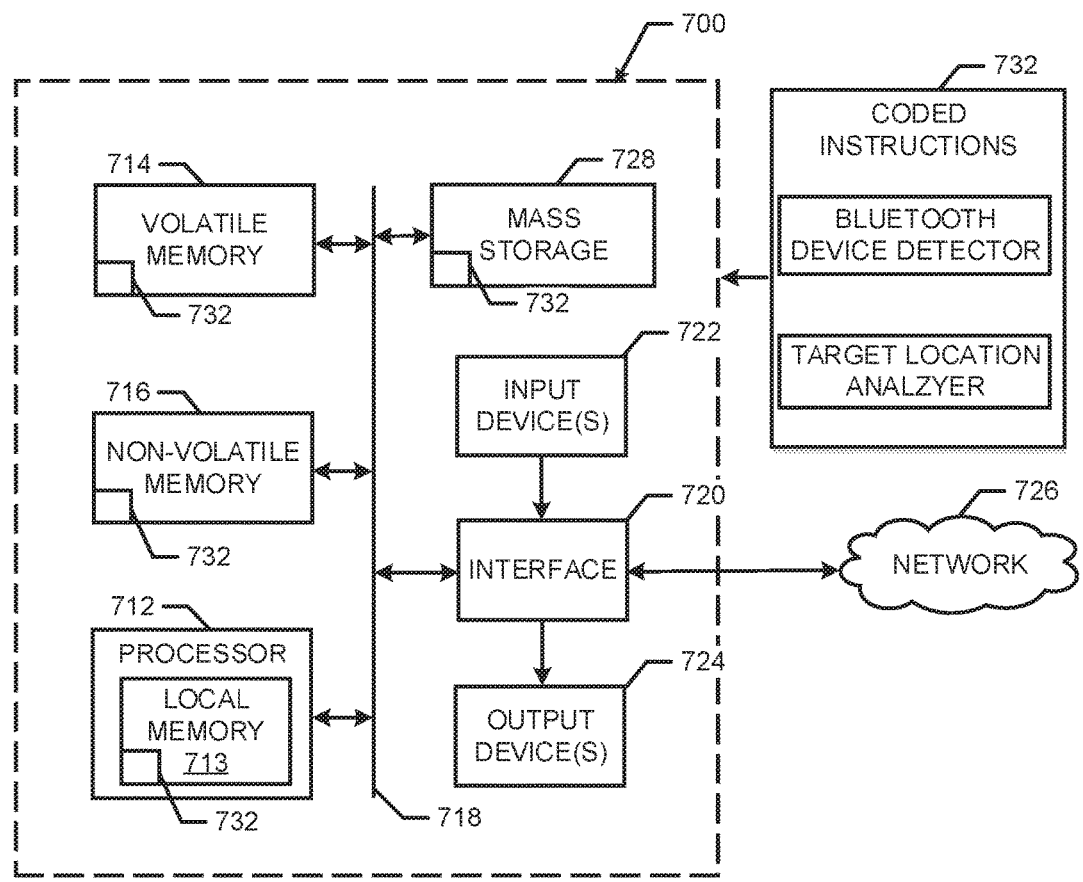
FIG. 7 is a block diagram of an example processor platform capable of executing the instructions of FIGS. 5 and/or 6 to implement the Bluetooth device locator of FIG. 2 and/or the target location analyzer of FIG. 3, respectively.

FIG. 7 is a block diagram of an example processor platform 700 capable of executing the instructions of FIGS. 5 and/or 6 to implement the Bluetooth device locator of FIG. 2 and/or the target location analyzer 132 of FIG. 3. The example processor platform 700 may be or may be included in any type of apparatus, such as a server, a personal computer, a mobile device (e.g., a cell phone, a smartphone, a tablet computer, etc.), or any other type of computing device.

The processor platform 700 of the illustrated example of FIG. 7 includes a processor 712. The processor 712 of the illustrated example is hardware. For example, the processor 712 can be implemented by at least one integrated circuit, logic circuit, microprocessor or controller from any desired family or manufacturer.

The processor 712 of the illustrated example includes a local memory 713 (e.g., a cache). The processor 712 of the illustrated example is in communication with a main memory including a volatile memory 714 and a non-volatile memory 716 via a bus 718. The volatile memory 714 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 716 may be implemented by flash memory, a persistent, byte-addressable memory accessible via a memory fabric and/or any other desired type of non-volatile memory device. Access to the main memory 714, 716 is controlled by a memory controller.

The processor platform 700 of the illustrated example also includes an interface circuit 720. The interface circuit 720 may be implemented by any type of interface standard, such as an Ethernet interface, a universal serial bus (USB), and/or a peripheral component interconnect (PCI) express interface.

In the illustrated example, at least one input device 722 is connected to the interface circuit 720. The input device(s) 722 permit(s) a user to enter data and commands into the processor 712. The input device(s) may be implemented by, for example, an audio sensor, a microphone, a camera (still or video), a keyboard, a button, a mouse, a touchscreen, a track-pad, a trackball, isopoint and/or a voice recognition system.

At least one output device 724 is also connected to the interface circuit 720 of the illustrated example. The output device(s) 724 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), and/or speakers). The interface circuit 720 of the illustrated example, thus, may include a graphics driver card, a graphics driver chip or a graphics driver processor.

The interface circuit 720 of the illustrated example also includes a communication device such as a transmitter, a receiver, a transceiver, a modem and/or network interface card to facilitate exchange of data with external machines (e.g., computing devices of any kind) via a network 726 (e.g., an Ethernet connection, a digital subscriber line (DSL), a telephone line, coaxial cable, a cellular telephone system, etc.).

The processor platform 700 of the illustrated example also includes at least one mass storage device 728 for storing executable instructions (e.g., software) and/or data. Examples of such mass storage device(s) 728 include floppy disk drives, hard drive disks, compact disk drives, Blu-ray disk drives, RAID systems, and digital versatile disk (DVD) drives.

The coded instructions 732 of FIGS. 5 and/or 6 may be stored in the mass storage device 728, in the local memory 713 in the volatile memory 714, in the non-volatile memory 716, and/or on a removable tangible machine readable storage medium such as a CD or DVD.

The above disclosed methods, apparatus and articles of manufacture may determine a location of a Bluetooth device relative to another device using measured RSSIs of Bluetooth signals from the Bluetooth device. In examples herein, a regression analysis may be performed as a detecting device moves and measures the RSSI from the Bluetooth device at a plurality of locations. In some examples, the regression analysis may determine candidate locations of the target Bluetooth device and one of the candidate location devices may be determined to be the actual estimated location of the Bluetooth device based on an orientation of the detecting device and/or characteristics of the RSSIs of the Bluetooth signal. In some examples, a collaborative correlation analysis may be performed on Bluetooth devices determines to be associated with the target Bluetooth device to verify the estimated location of the target Bluetooth device. Accordingly, examples herein may determine a proximate relative location (e.g., distance and direction from a detecting device) of a Bluetooth device rather than a general direction from a detecting device.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A method implemented by a detecting device to determine a location of a Bluetooth device, the method comprising:
    detecting a Bluetooth signal from the Bluetooth device at a first location of the detecting device and determining a first received signal strength indicator (a first RSSI) of the Bluetooth signal at the first location;
    detecting the Bluetooth signal from the Bluetooth device at a second location of the detecting device and determining a second RSSI of the Bluetooth signal at the second location;
    determining a first direction of the Bluetooth signal based on a first orientation of the Bluetooth device at the first location and a second direction of the Bluetooth signal based on a second orientation of the Bluetooth device at the second location; and
    determining a location of the Bluetooth device, relative to the detecting device based on a regression analysis of the first RSSI and the second RSSI, the first direction of the Bluetooth signal, and the second direction of the Bluetooth signal at the first location of the detecting device and at the second location of the detecting device, with respect to a distance between the first location of the detecting device and the second location of the detecting device measured by the detecting device.

2. The method as defined in claim 1, further comprising:
    determining a relative location of the Bluetooth device by calculating a differential of the first RSSI and the second RSSI; and
    optimizing the differential based on a least squares regression.

3. The method as defined in claim 1, further comprising:
    detecting the Bluetooth device based on an identification broadcast in the Bluetooth signal.

4. The method as defined in claim 1, wherein determining a location of the Bluetooth device, relative to the second location based on the first RSSI and the second RSSI comprises determining two candidate locations of the Bluetooth device, relative to the second location.

5. The method as defined in claim 1, further comprising:
    detecting a plurality of Bluetooth signals from a plurality of Bluetooth devices, the Bluetooth signal selected from the plurality of Bluetooth signals and the Bluetooth device selected from the plurality of Bluetooth devices;
    determining that the plurality of Bluetooth signals from the Bluetooth devices are associated with one another based on a similarity of RSSIs of each of the plurality of Bluetooth signals; and
    determining the location of the Bluetooth device based on an analysis of a determined location of at least one of the plurality of Bluetooth devices that is different from the Bluetooth device.

6. The method as defined in claim 1, further comprising:
    indicating the location of a target Bluetooth device by presenting the location on a display of the Bluetooth device, the display indicating the location of the target Bluetooth device, relative to the Bluetooth device.

7. The method as defined in claim 1, wherein the location of the Bluetooth device relative to the detecting device comprises the location of the Bluetooth device relative to the second location of the detecting device.

8. A non-transitory machine readable medium comprising instructions that, when executed, cause a machine to at least:

receive multiple RSSIs (received signal strength indicators of a Bluetooth signal of a target Bluetooth device and a plurality of orientations of the target Bluetooth device;

perform a regression analysis on the RSSIs of the Bluetooth signal, at multiple locations of a mobile Bluetooth device where the RSSIs of the Bluetooth signal were measured; and determine candidate target locations of the target Bluetooth device based on the regression analysis, a distance between the locations of the mobile Bluetooth device where the RSSIs of the Bluetooth signal were measured, and a plurality of directions of the Bluetooth signal based on the plurality of orientations of the mobile Bluetooth device, wherein the distance between the locations is measured by the mobile Bluetooth device, and one of the candidate target locations is an estimated actual location.

9. The non-transitory machine readable medium of claim 8, wherein the instructions, when executed, further cause the machine to:

compare of the Bluetooth signal to multiple RSSIs from a second Bluetooth signal;

determine that the Bluetooth signal and the second Bluetooth signal correspond to the target Bluetooth device and a second Bluetooth device associated with the target Bluetooth device, respectively; and verify that the candidate target locations of the target Bluetooth device correspond to candidate locations of the second Bluetooth device.

10. The non-transitory machine readable medium of claim 9, wherein the instructions, when executed, further cause the machine to:

compare characteristics of the RSSIs of the Bluetooth signal to characteristics of the RSSIs of the second Bluetooth signal; and determine that the second Bluetooth device is associated with the target Bluetooth device based on the characteristics of the RSSIs of the Bluetooth signal and the characteristics of the RSSIs of the second Bluetooth signal.

11. The non-transitory machine readable medium of claim 8, wherein the instructions, when executed, further cause the machine to:

determine one of the candidate target locations of the target Bluetooth device, based on an orientation of the mobile Bluetooth device when the RSSIs of the target Bluetooth device were measured.

12. The non-transitory machine readable medium of claim 8, wherein the instructions, when executed, further cause the machine to provide the candidate target locations to the mobile Bluetooth device via a network communication link.

13. The non-transitory machine readable medium of claim 8, wherein an estimated actual location of the target Bluetooth device comprises a location relative to the mobile Bluetooth device.

14. A system comprising:

a target location analyzer operable to:

receive RSSIs (received signal strength indicators) and multiple directions of multiple Bluetooth signals from a target Bluetooth device, perform a regression analysis based on the RSSIs and directions at respective locations and orientations of a detecting device that measured the RSSIs, and determine candidate locations of the target Bluetooth device based on the regression analysis and a distance between multiple locations of a detecting device that measured the RSSIs, wherein the distance between the locations is measured by the target location analyzer; and a Bluetooth device locator operable to:

determine an orientation of the detecting device, and determine the direction of the Bluetooth signals from the target Bluetooth device based on the orientation of the detecting device.

15. The system of claim 14, wherein the Bluetooth device locator is further operable to:

analyze characteristics of the RSSIs of the Bluetooth signal, and select the one of the candidate locations of the target Bluetooth device based on the characteristics of the RSSIs of the Bluetooth signal.

16. The system of claim 15, wherein the Bluetooth device locator is further operable to:

compare the characteristics of the RSSIs to characteristics of RSSIs in a historical database, the historical database indicating a direction from which previous Bluetooth signals were received by the detecting device, the orientation of the device when the previous Bluetooth signals were received, and the characteristics of the previous Bluetooth signals.

17. The system of claim 15, wherein the detecting device comprises the Bluetooth device locator, and the target Bluetooth device is located on a server in communication with the detecting device.

18. The system of claim 15, wherein the detecting device comprises the Bluetooth device locator and the target location analyzer.

19. The system of claim 15, wherein the target location analyzer is further operable to:

compare the RSSIs of the Bluetooth signal to RSSIs of a second Bluetooth signal;

determine that the Bluetooth signal and the second Bluetooth signal correspond to the target Bluetooth device and a second Bluetooth device associated with the target Bluetooth device, respectively; and verify that the candidate locations of the target Bluetooth device correspond to candidate locations of the second Bluetooth device.

* * * * *